३,३४६,४०९
ZINC OXIDE COMPOSITIONS AND METHOD
OF MAKING THEM
John E. Walrond, Beaver Falls, Pa., assignor to St. Joseph
Lead Company, New York, N.Y., a corporation of
New York
No Drawing. Filed June 24, 1965, Ser. No. 466,814
11 Claims. (Cl. 106—296)

This invention relates to a process for the preparation of zinc oxide compositions suitable for use as pigments in paints and enamels and as fillers for paper, plastic compositions and the like and to the products formed by the process. The invention also relates to improved oil paint compositions prepared from zinc oxide based pigments made according to the process of the present invention.

The advantages of using zinc oxide as a pigment in oil paints have been recognized for many years. Zinc oxide is effective in controlling mildew and mold; it reacts with the acidic oxidative degradation products of oil vehicles to form zinc soaps; and it is a more efficient absorber of ultraviolet light than any other white pigment. Because of these desirable properties, zinc oxide substantially improves the service life and decorative value of oil paints.

There is, however, a tendency for exterior oil paints containing zinc oxide to swell, blister, and peel from a wood substrate that has become saturated with water. Such a condition may result from an architectural or a structural defect in a building that permits water from an exterior source to saturate painted wood. More frequently, it is caused by the migration of warm moist air through the walls of buildings during winter months with the resultant condensation of water on the back of colder wood siding.

It is an object of the present invention to provide a zinc oxide composition suitable for use as a pigment or filler in paints, enamels, paper, plastic compositions and other industrial products.

It is a further object of the invention to provide zinc oxide-containing oil paint compositions which resist swelling, blistering and peeling on exposure to adverse conditions of moisture.

The present invention is based on the discovery that the above objectives can be achieved by calcining zinc oxide in the presence of lithium oxide or a substance capable of forming lithium oxide at the temperature of treatment. The thus modified zinc oxide can be incorporated into paint formulations and other industrial products in the same manner as unmodified zinc oxide.

More particularly, the process of the invention comprises subjecting zinc oxide to a temperature of from about 500° C. to about 1000° C. in the presence of lithium oxide or a substance capable of forming lithium oxide at the temperature of treatment, such as lithium hydroxide, lithium carbonate and lithium acetate, in an amount equivalent to about 0.1% to about 2% of lithium oxide by weight of the zinc oxide. In general, the time of treatment may be between five and ten minutes.

Another aspect of the invention resides in oil paint compositions containing a zinc oxide pigment made by the process of the invention.

The processes and products of the invention are further illustrated by the following discussion and examples:

The amount of blister resistance obtained in the final paint product depends on the amount of lithium oxide present or formed in the calcination step. The beneficial effect of lithium oxide in inhibiting blistering, swelling or peeling has been observed at concentrations as low as 0.1% by weight of the zinc oxide pigment. Maximum blister resistance has been found to be achieved when the lithium content of the zinc oxide pigment is equivalent to approximately 0.5 to 1.5% lithium oxide by weight. Pigments containing more lithium do not blister but some thickening of linseed oil paints may result when the zinc oxide pigment contains more than about 1.5% by weight of lithium oxide.

The zinc oxide and lithium compound are preferably blended into a homogeneous mixture prior to calcination. Dry blending in a suitable mixer is preferred. The resultant blend is then calcined in air, preferably in a non-reactive ceramic tube, at a temperature between about 500° and about 1000° C. Temperatures below about 500° C. are not high enough to improve blister resistance; temperatures above about 1000° C. may cause discoloration of the zinc oxide and may produce excessive particle growth. Temperatures of 750° C. to 925° C., with retention times of five to ten minutes, produce zinc oxide pigments that afford superior blister resistance and superior package stability of the paint product. Higher retention times show no deleterious effects except additional crystal growth.

Instead of blending the lithium compound with the zinc oxide prior to calcining, lithium oxide may be sublimed, preferably in a current of inert carrier gas, into the calcining chamber containing the zinc oxide to be treated.

The useful properties of the lithium-containing zinc oxide pigments may be improved by the addition of a small amount of a sodium compound during the calcining operation. For example, the addition of from about 0.5% to about 5% of sodium carbonate, sodium silicate or sodium oxide has been found to reduce the particle growth of zinc oxide-lithium carbonate blends during the calcination step, and paints made from the resulting pigments have excellent stabiity.

When zinc oxide blended with lithium carbonate, or other heat-decomposable lithium compound, and dry sodium silicate is calcined at from about 500° C. to about 1000° C. there is obtained a stable pigment of good blister resistance. A slurry of sodium silicate, zinc oxide and water can be mixed thoroughly, filtered, dried, blended with lithium carbonate and calcined. Pigments prepared by this method also produce paints with good stability and blister resistance. In general, from about 1% to about 3% of the sodium compounds give particularly satisfactory results. All or a part of the sodium compounds may be replaced by the corresponding potassium compounds.

The invention is further illustrated by the following examples:

Pigment grade zinc oxide was blended with 5%, 3%, 2% and 1% by weight of lithium carbonate and calcined at 750° C. for about 10 minutes. The resulting pigments were incorporated in the following standard linseed oil type paint formulation:

| | Parts by weight |
|---|---|
| Zinc oxide pigment | 275 |
| Titanium dioxide | 180 |
| Magnesium silicate | 346 |
| Raw linseed oil | 300 |
| Bodied linseed oil | 115 |
| Thinner and drier | 142 |

All of the paints thus obtained showed improved blister resistance, with the 3% and 5% modifications being completely free of blistering.

Similar results are obtained when lithium oxide or lithium hydroxide are used instead of lithium carbonate.

The lithium oxide-modified zinc oxide pigments of the invention produce paints with higher moisture vapor permeability and a lower degree of area swelling than unmodified zinc oxide.

When the modified zinc oxides of the invention are used as a filler for paper products by adding them to the paper beater in a papermaking stock furnish containing rosin size and alum, the resulting paper has an opacity, brightness, burst and tear factors substantially superior to paper made with the same amounts of unmodified zinc oxide.

The foregoing examples are presented for the purpose of illustrating the principles of the invention. The scope of the invention is defined by the appended claims and is not dependent on any particularly theoretical mode of operation nor limited to the procedures specifically described.

I claim:

1. A process for preparing zinc oxide pigment and filler compositions which comprises subjecting zinc oxide to a temperature of at least about 500° C. in the presence of a substance selected from the group consisting of lithium oxide and substances capable of forming lithium oxide at the temperature of treatment in an amount equivalent to from about 0.1% to about 2% of lithium oxide by weight based on the zinc oxide.

2. A process as defined in claim 1 wherein the temperature of treatment is in the range from about 750° to about 925° C.

3. A process as defined in claim 1 wherein the substance is lithium carbonate.

4. A process as defined in claim 1 wherein the substance is lithium oxide.

5. A process as defined in claim 1 wherein the substance is lithium hydroxide.

6. A process as defined in claim 1 wherein the treatment is carried out in the presence of from about 0.5% to about 5% of an alkaline sodium compound.

7. A process as defined in claim 6 wherein the sodium compound is sodium silicate.

8. A zinc oxide pigment and filler composition consisting of the calcination product of zinc oxide and from about 0.1% to about 2% of lithium oxide by weight based on the zinc oxide.

9. A zinc oxide pigment and filler composition consisting essentially of zinc oxide and from about 0.1% to about 2% of lithium oxide by weight based on the zinc oxide.

10. A blister resistant oil based paint composition including a pigment consisting of the calcination product of zinc oxide and from about 0.1% to about 2% of lithium oxide by weight based on the zinc oxide.

11. A blister resistant oil based paint composition including a pigment consisting essentially of zinc oxide and from about 0.1% to about 2% of lithium oxide by weight based on the zinc oxide.

References Cited

UNITED STATES PATENTS 3,264,229   8/1966   Klein _____ 106—296

TOBIAS E. LEVOW, *Primary Examiner.*

JAMES E. POER, *Examiner.*